Oct. 6, 1970 C. C. PERKINS ET AL 3,533,076

ELECTRONIC ACCOUNTING APPARATUS

Filed Oct. 30, 1967 3 Sheets-Sheet 1

INVENTORS.
DAYTON W. FITZER.
CORNELIUS C. PERKINS.

BY Paul W. Fish

ATTORNEY.

ELECTRONIC ACCOUNTING APPARATUS

Filed Oct. 30, 1967 3 Sheets-Sheet 2

INVENTORS.
DAYTON W. FITZER.
BY CORNELIUS C. PERKINS.

ATTORNEY.

INVENTORS.
DAYTON W. FITZER.
BY CORNELIUS C. PERKINS.
Paul W. Fish
ATTORNEY.

United States Patent Office 3,533,076
Patented Oct. 6, 1970

3,533,076

ELECTRONIC ACCOUNTING APPARATUS

Cornelius C. Perkins, Birmingham, and Dayton W. Fitzer, Dearborn Heights, Mich., assignors to Burroughs Corporation, Detroit, Mich., a corporation of Michigan

Filed Oct. 30, 1967, Ser. No. 678,812
Int. Cl. G06f *9/06*
U.S. Cl. 340—172.5 11 Claims

ABSTRACT OF THE DISCLOSURE

Electronic data processing apparatus of the serial step program type including variable function key means for permitting the operator to select one of a plurality of program designatable subroutines which may be selected for implementation intermediate adjacent steps of the program. In accordance with another aspect of the present disclosure, indicator means associated with each variable function key alert the operator and identify the various branch subroutines which are available at a particular junction of the program.

BRIEF DESCRIPTION

This invention relates to serial program step electronic data processing apparatus and more particularly to improved, highly versatile data processor accounting apparatus including variable function keys whereby the operator may select one of a plurality of programmable branch subroutines.

BACKGROUND

As is known in the computer art it is often desirable in operating computers, data processors and the like to allow for a variation in the designated sequence of program steps. It is well known for a programmer to establish and implement this feature by providing for branch instructions at various points in the program. When the program being run encounters a branch condition or instruction, one of an alternate number of paths are then taken depending upon the conditions at that time and their relationship to established criteria by which the branch instructions are to be evaluated and selected.

In accounting type data processing apparatus, it is often desirable for the operator to enter appropriate data at various points in the program. Such entries may correspond to the actual factors relating to a particular business transaction. For example, the operator may wish to enter the name of a salesman who made the sale, the appropriate tax for a particular jurisdiction in which the sales transaction took place or similar entries that will normally vary from operation to operation of the machine. Such operator entries may of course be accomplished by releasing the keyboard to the operator at the appropriate time and relying on the operator to type in the appropriate information. This method of releasing the keyboard to the operator and relying upon the operator to enter the appropriate information while generally satisfactory is somewhat slower than the normal operating speed of the machine, thereby reducing the task processing efficiency. Further, such a technique is often difficult to implement when training a new operator on the machine.

It is therefore an object of the present invention to provide improved apparatus for implementing branch instruction in electronic accounting apparatus and the like.

It is a further object of the present invention to increase the speed with which selective branching to one of a plurality of programmable subroutines may be accomplished in electronic accounting apparatus.

It is a further object of the present invention to provide variable function key operation for electronic accounting apparatus.

It is yet a further object of the present invention to simplify the training of operators on electronic accounting apparatus.

It is yet another object of the present invention to extend the versatility of electronic accounting apparatus by providing program designatable variable function key capabilities.

It is a still further object of the present invention to enable the operator of an electronic accounting apparatus to select one of a plurality of program designatable subroutines intermediate adjacent steps of a serial program.

In accomplishing the above objects and other desirable aspects applicants have invented novel logical control apparatus responsive to a plurality of predetermined groups of programmable instructions for alerting the operator which branch or alternative branch subroutines are available at a designated point in the program and for permitting the election of one of said available subroutine programs by the operator. In accordance with applicants' invention a programmable number of key selectable subroutines is available at any junction of the program. The operator implements the execution of the operator selected subroutine by actuating one of a plurality of variable function keys. In response to the operator's selection of one of the available subroutines, the control apparatus effectuates the execution of the selected subroutine and thereafter returns the control of the data processing apparatus to the normal program sequence control.

For a more complete understanding of applicants' invention, reference may be had to the following detailed description in conjunction with the drawings wherein.

NORMAL PROCESSOR OPERATION

Figure 1:
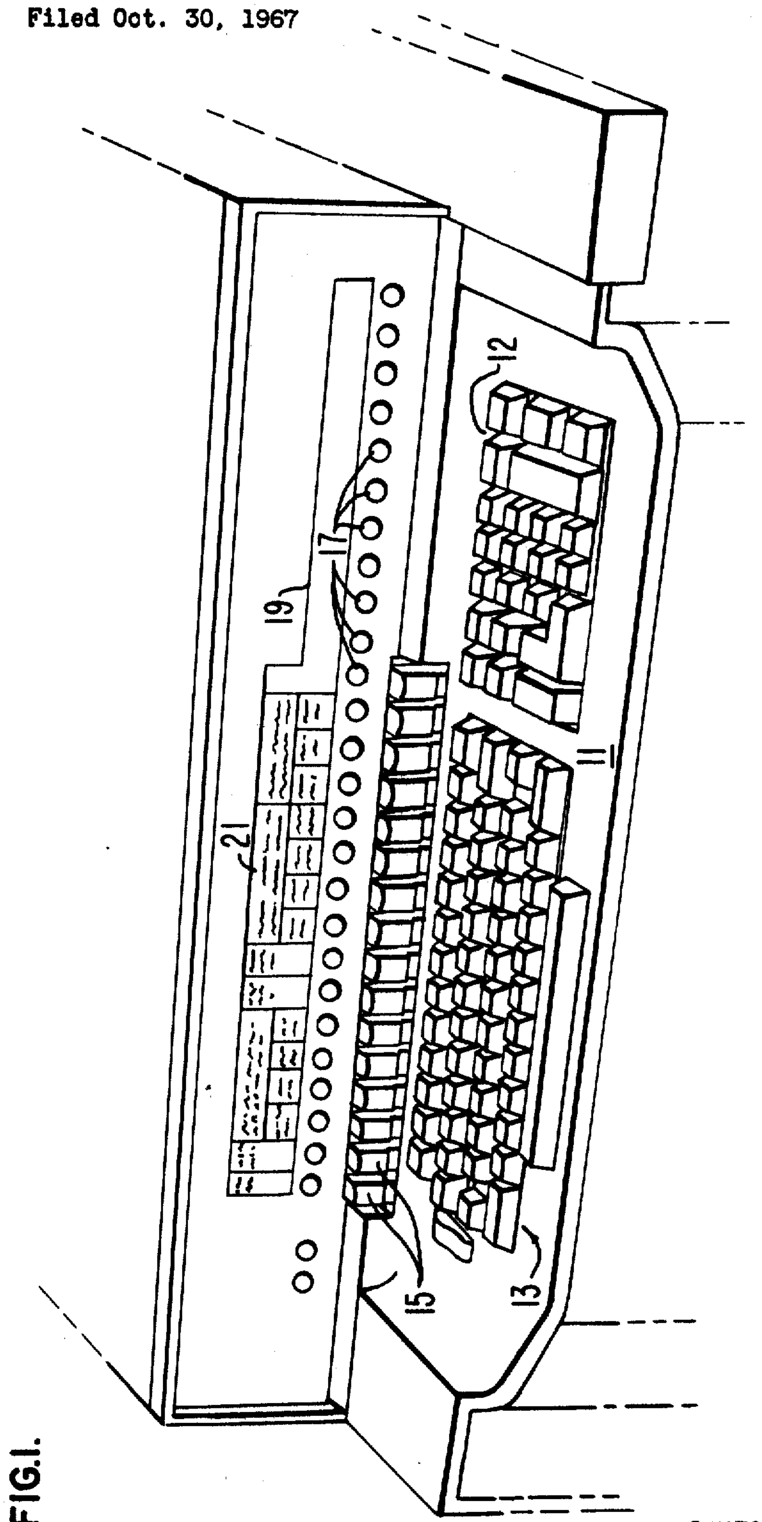
FIG. 1 illustrates a keyboard of an electronic accounting apparatus incorporating the principles of the present invention.

With reference to FIG. 1, there is shown a multisection keyboard embodying one aspect of the principles of the present invention. As illustrated, the keyboard 11 associated with an accounting machine comprises a numeric section 12 and an alpha section 13. The structure of the numeric and alpha sections of the keyboard may comprise any of the types well known in the art wherein the depression of a key results in the generation of a unique mechanical positioning of code bail members. The positioning of the code bails then may be sensed and converted into electrical signals for generating a coded signal corresponding to the particular key depressed. In normal operation the program and object data is entered into a memory from which it may be transferred, as hereinafter explained, to a processor for handling in accordance with the steps of the program being run.

In accordance with the principles of the present invention a plurality of program select keys 15 are arranged on the operator console. The selection of a particular program select key 15 during the program effectuates, in a manner hereinafter to be described, the selection and execution of a designated branch subroutine operation. As used herein subroutine or subroutine operation is defined to mean any one of the following or a combination thereof: (1) a single instruction occupying a particular subroutine table entry position; (2) a branch instruction for unconditionally branching from the step of the program being run to another program the beginning address of which is located at a particular subroutine table entry position; or (3) a subroutine jump command for temporarily leaving the program being run to carry out a sequence of steps before returning to the next step of the program.

As the function performed by an operator selected program select key 15 is determined by the subroutine specified by the programmer, these keys 15 are hereinafter referred to as variable function keys. A plurality of indicators 17 are arranged to signal the active status of the associated variable function keys 15 cooperably juxtapositioned therewith. In the preferred embodiment the indicator means, which may comprise a plurality of selectively energizable lamps, are positioned as shown above its associated key. When lit, the indicator 17 indicates that the associated program select key is in the active status. A support 19, which may comprise an essentially channel shaped member with inwardly turned edges, is positioned above the indicator lamps 17 to hold an operator prompter instruction tape 21 in a removable manner. The operator instruction tape 21 inserted in and held by the support 19 is appropriately marked to indicate to the operator the various branch subroutines available whenever the indicator lamps 17 and the associated programmer select keys 15 are activated in response to the occurrence of a variable function key program instruction operation in the program.

ACCOUNTING APPARATUS-NORMAL OPERATION

Figure 2:
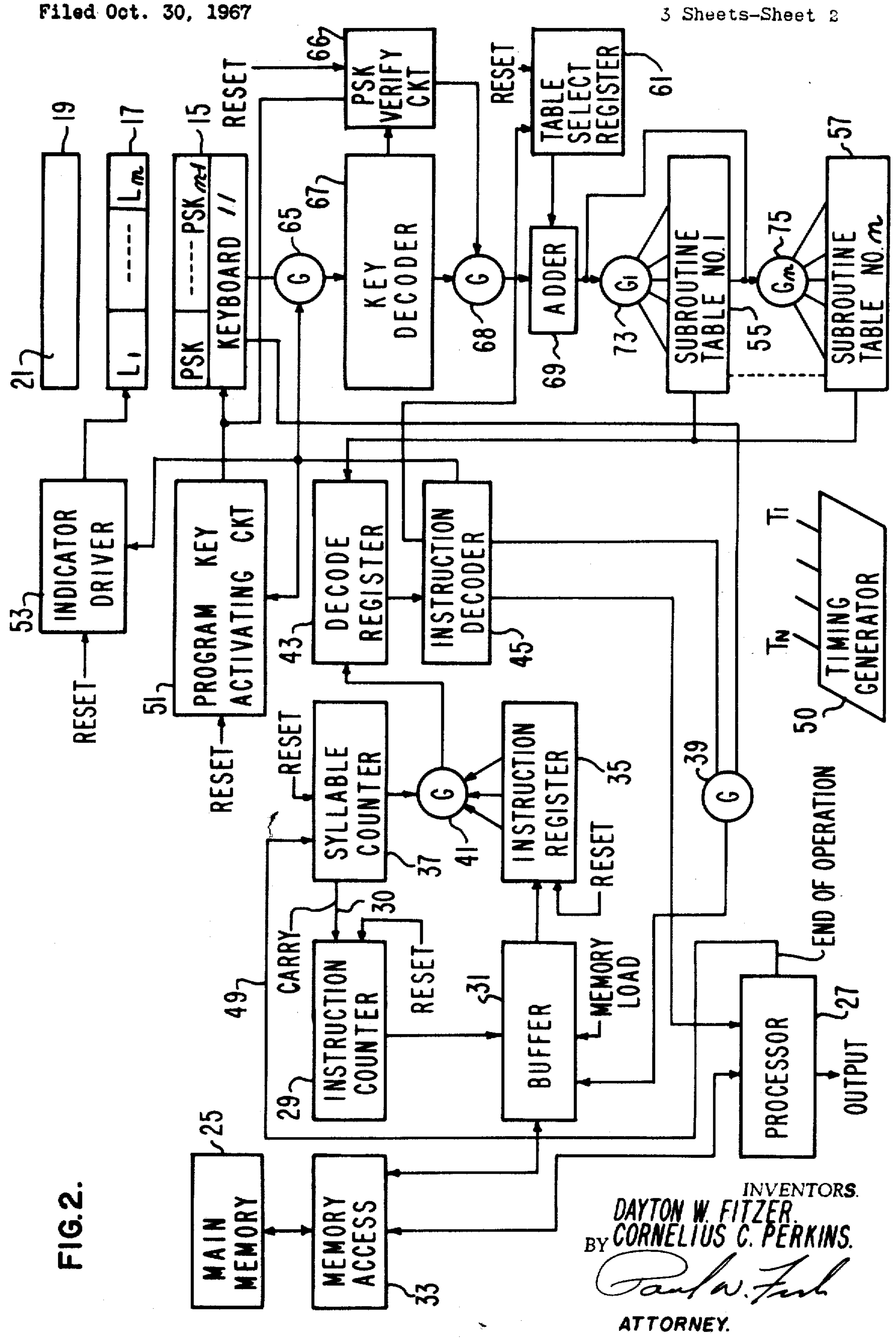
FIG. 2 illustrates a logical block diagram of an electronic data processing apparatus embodying the principles of the present invention.

With reference to FIG. 2 there is shown a logical block diagram of a serial program step electronic accounting apparatus in accordance with the principles of the present invention. A main memory 25, which may comprise any apparatus for storing information in encoded form, for example a core memory, is arranged to store program and object data. The information stored in main memory 25 is processed in accordance with the program instructions by processor 27. In operation the instruction counter 29 is normally preset at the beginning of operation of the apparatus to a predetermined count and is arranged to sequentially withdraw the sequential program steps stored in the main memory in accordance with the count of the counter. In accordance with the preferred embodiment a word in main memory comprises a plurality of syllables for example, four. The instruction counter 29 interrogates the main memory 25 via buffer 31 and memory access 33 thereby withdrawing the appropriate program instruction and transferring it to instruction register 35. Syllable counter 37 is arranged to interrogate the instruction register 35 and to transfer via gate 41 an appropriate syllable in the instruction register 35 corresponding to the count of the syllable counter 37. Gate 41 transfers the selected syllable to the decoder register 43 which in turn transfers the particular syllable to the instruction decoder 45. The instruction decoder 45, which may comprise any type known in the art for example a diode array, generates an output to control the operation of the processor 27. The processor 27, which may comprise an array of logical circuitry of any well known type, is arranged to operate on the object data in accordance with the decoded instructions from the instruction decoder. The processor 27 generates an appropriate output, for example, to drive a printer for generating an output of the accounting apparatus.

At the end of each program step of the processor, a signal is sent via the line 49 to the syllable counter 37. In this manner the count of the syllable counter 37 is advanced after the processor completes each program step thereby transferring the next syllable from the instruction register 35 to the decoder register 43. In the manner hereinabove described the decoder register 43 drives the instruction decoder 45 to control the processor 27 in accordance with the contents of the next program instruction syllable. Each time the syllable counter reaches a predetermined count it generates a carry signal. This carry signal is coupled to the instruction counter 29 via cable 30 thereby advancing the instruction counter to the next count in its orderly count sequence. The instruction counter 29 then interrogates the main memory 25 via the buffer 31 and memory access 33 to withdraw the next in the series of instruction words as determined by the count in counter 29. The instruction word is then transferred, as hereinabove described, to the instruction register 35. In accordance with the particular count of the syllable counter 37, gate 41 sequentially transfers the respective syllables of the memory word in the instruction register 35 to the decoder register 43. Thereafter, the instruction decoder 45 in response to the contents of the decoder register 43 again signals the processor to accomplish the task indicated by such instruction syllable. In this manner the various sequential steps of the serial program are sequentially taken thereby generating the appropriate output corresponding to the program and object data contained in the main memory 25.

The program and object data may be loaded in the main memory from the keyboard 12 or any memory loading means known in the art for example via gate 39. As is known to those skilled in the computer art, the timing and sequencing of various ones of the operations of computer-type apparatus must be accurately maintained. Timing generator 50 schematically illustrates circuitry for generating the necessary clock pulse timing pattern for controlling the operation of the computer apparatus illustrated in FIG. 2. This timing circuitry may be of any type well known in the art for generating a cyclic timing pulse pattern for controlling and sequencing the various operations of the logical elements of the computer in accordance with a predetermined timing sequence.

VARIABLE FUNCTION KEY OPERATION

In normal operation, the instruction counter 29 and the associated syllable counter 37 control the withdrawal of sequential program steps from the main memory 25 and instruct and control the processor to process the information data in accordance with the respective program steps. As hereinbefore described it is often desirable for the operator to select one of a variable number of subroutines at predetermined points in the program for accomplishing the processing of a particular task.

In accordance with the principles of the present invention the operator of accounting apparatus incorporating the principles of the present invention is able to select one of a plurality of subroutines at programmer-determined points in the program. In this manner the operator is able to select the appropriate subroutine for accomplishing the desirable functions at the particular point of the program.

In implementing the variable function key operations the programmer at the appropriate point in the program indicates to the operator the number of available branch subroutines by means of a variable function key instruction. When this variable function key instruction is transferred under the control of the syllable counter 37 from the instruction register 35 to the decoder register 43, the instruction decoder 45 then actuates the appropriate program select keys 15 and program select key indicators 17 via the control and driver circuitry 51 and 53, respectively. In another or preceding instruction the programmer would indicate the location and address position of the available subroutines in subroutine tables 55 and 57 by setting the appropriate address constant into the table select register 61. During an operation step an appropriate keyboard instruction would be transferred to the decoder register 43 thereby enabling the indicator lamps 17 and halting the machine operation.

The operator now alerted as to the available subroutines by the actuation of the respective associated indicators 17, can then select the appropriate subroutine by operating one of the actuated program select keys 15. As hereinabove described, an appropriate operator prompter strip 21 is preferably juxtapositioned with the indicator lamps 17 to indicate what subroutines will be carried out at that point in the program in response to the selection of one of the activated keys 15.

With the available variable function subroutine keys 15 actuated and the associated indicator lamps 17 lighted to identify these keys, the operator selects the appropriate subroutine to be run. In response to the keyboard instruction in the instruction decoders 45 the variable function gate 65 is primed to receive and pass the appropriate entry from the keyboard. In response to the operation of a particular program select key, the output of gate 65 is entered into key decoder 67. The output of key decoder 67 is coupled via gate 68 which is controlled by PSK verify circuit 66 to the input of adder 69 where it is combined with the contents of the table select register 61. Adder 69 combines the output of key decoder 67 with the contents of table select register 61 thereby generating the appropriate address to enable gates 73 or 75 to select the appropriate subroutine entry stored in subroutine tables 55 and 57.

In response to this interrogation of the subroutine tables 55 or 57 by gates 73 and 75, the selected subroutine is read from the selected table and coupled to an input of decoder register 43. In the manner hereinabove described the decoder register 43 actuates the instruction decoder 45 which in turn generates the appropriate instruction for controlling the processor 27. In this manner the processor carries out the desired subroutine as specified by the instruction read from tables 55 or 57 and thereafter generates an end of processor program step signal which is coupled to the syllable counter 37. As hereinabove described this end of step or carry signal advances the count of the syllable counter 37, and if appropriate the instruction counter, thereby selecting the next instruction syllable to be transferred from the instruction register to he decoder register. In this manner the desired subroutine is carried out without interfering with the next in the ordered sequence of steps in the program which have been stored in the memory 25 or instruction register 35 during the performance of the subroutine.

As the processor 27 is able to directly access and communicate with the main memory 25, the particular subroutine instruction from tables 55 and 57 may comprise a relative address which instructs the processor 27 to interrogate the memory to obtain the paricular subrouine desired.

By having the individual program select keys 15 generating a unique code signal it is possible to add the individual key identifying signal to the contents of the table select register 61 to access the appropriate memory location in any one of a plurality of the subroutine tables, for example, 1 through N. Further, as hereinabove described, the output from the instruction decoder may be used to set an appropriate address instruction constant into the table select register 61 thereby enabling the programmer to designate the location of one of various subroutines which are available to the operator at a particular time. With the variable address of the subroutines being programmable, the actuation of a particular key at different times in the program may effectuate entirely different operation. For example, during a particular program the success of the depression of the same program select key 15 by the operator may result in two entirely different functions, i.e., unrelated subroutines. Thus, the program settable contents of the table select register 61 enables the variable program select keys to function as truly variable function keys in that the particular operation performed in response to the operator's selection of one of the enabled variable function keys is dependent upon the program designated addresses and subroutine contents thereof which may be accessed in response to the output of the adder 69.

Figure 3:
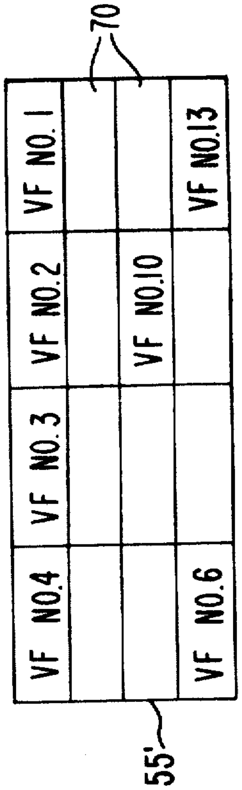
FIG. 3 schematically illustrates a program subroutine table in accordance with one aspect of the principles of the present invention.

Referring now to FIG. 3 there is shown a subroutine table 55' organized in accordance with the principles of one aspect of the present invention. As hereinbefore described the programmer designates what subroutines are to be stored at which location in the subroutine tables. Thereafter the programmer permits the operator to selectively access one or more of the table entries by operating a variable function key which has been activated by program instructions. In accordance with the principles of the present invention, the subroutine table 55' may form a specified portion of the main memory 25 or may comprise a separate memory 55' having individually addressable units 70 for storing variable function subroutines VF #1 through VF #16. In the case where the program table forms a portion of the main memory the orientation and structure of the program table would be determined by the type of word organization and access which may be made to the main memory. In the case wherein a main memory word comprises a plurality of syllables, as hereinbefore described in conjunction with FIG. 2, it may be desirable to withdraw the entire word from memory and thereafter to select the particular syllable of the word which corresponds to the desired subroutine function.

As discussed in conjunction with FIG. 1, a plurality of variable function keys 15 are preferably incorporated in a single machine. Either a single subroutine, VF #$n$, or a word of memory, i.e. a plurality of subroutines, for example, form (VF #$n$ to VF #$n$+4), may be withdrawn from the memory table 55' for each actuation of a key 15. In the instance where a single variable function subroutine (VF #$n$) is to be withdrawn, the address from the adder 69 would correspond to the address of the selected addressable unit 70 of table 55'. In the instance where a specific word from table 55' is to be withdrawn, the appropriate address hereof would be identified by the programmer, i.e., by setting the appropriate address into the table select register 61 as discussed in conjunction with FIG. 2. After the word, for example VF #1 to VF #4, is withdrawn from table 55', the particular syllable, i.e. subroutine, within the word could be selected by decoding the electrical signal generated in response to the actuation of a variable function key by the operator. For example, with reference to FIG. 3 it is possible for the operator to designate one of a plurality of subroutine tables 55' which may be accessed by the selection of an enabled variable function key by specifying the address which corresponds to the memory location of the first syllable of a word. After the memory word is withdrawn a particular syllable corresponding to the selected subroutine instruction could then be withdrawn or pulled out of the word by logical gating circuitry responsive to a constant, i.e. coded signal which is determined by the individual key selected by the operator. The structure and function of the subroutine memory table may be of any type well known in the art. For example, for a word organized type, it may comprise a word organized magnetic core memory. Similarly, for a single element addressable type it may comprise a plurality of bistable devices arranged to receive and store information at predetermined individually addressable locations within a static or dynamic memory.

Figure 4:
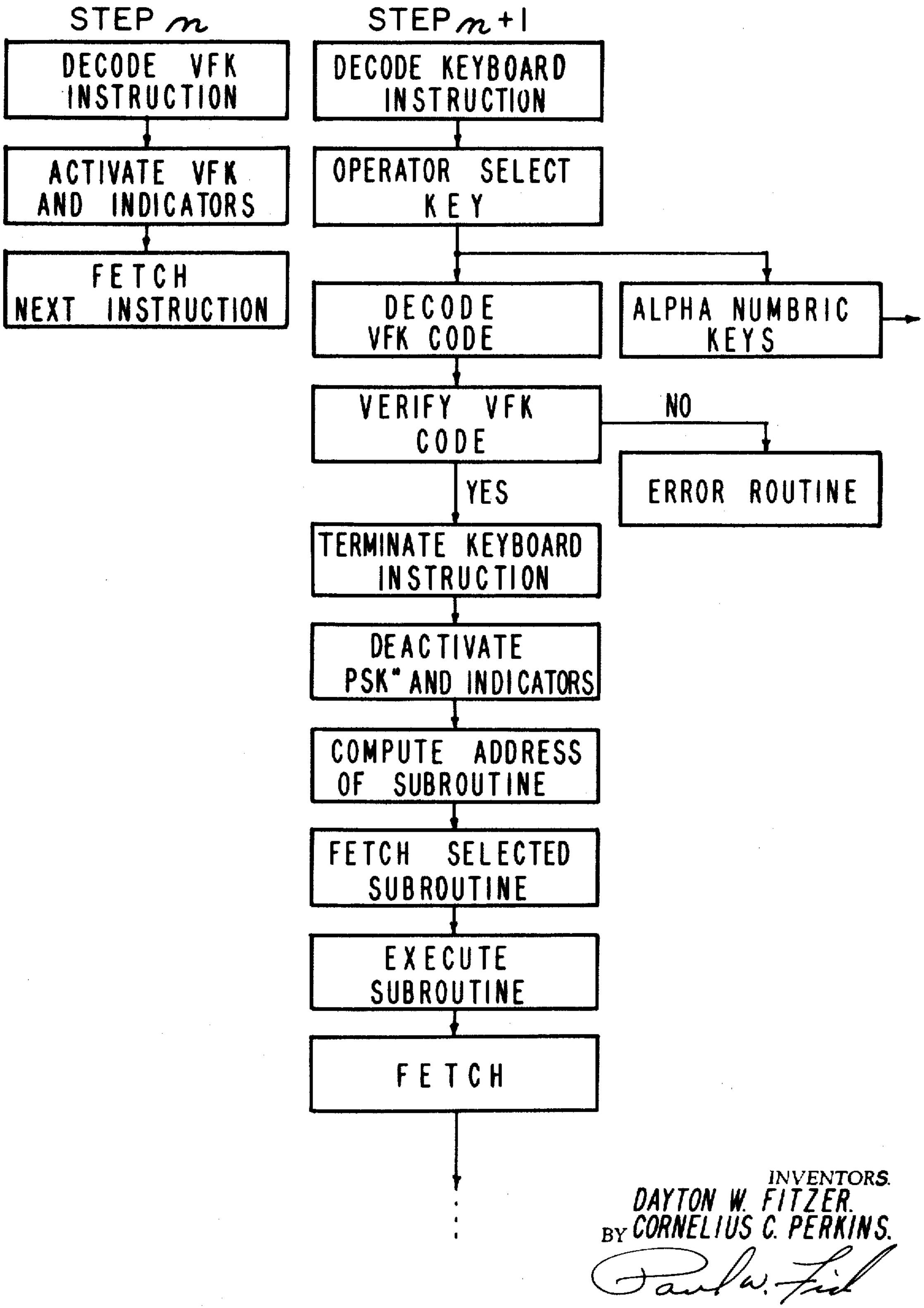
FIG. 4 illustrates a logic flow diagram of the steps in accomplishing the variable function key selectable subroutines in accordance with the principles of the present invention.

Referring now to FIG. 4 there is shown a flow diagram of the steps involved in accomplishing in accordance with applicants' invention the insertion of a variable function key selected subroutine intermediate serial steps of a serial program data processing apparatus. As in hereinabove discussed in conjunction with FIGS. 1 and, the information data in a serial program device is controlled by the manipulative steps specified by the program data. The program steps control the operation of the processor and in a normal operation the processor following the various steps of the program accomplishes the desired function. As hereinabove discussed the variable key function in accordance with the principles of applicants' invention allows the operator to select one of a plurality of subroutines intermediate adjacent steps of the serial program.

With reference to FIG. 4 it may be seen that in the preferred embodiment two program instructions accomplish the insertion of one of the various function subroutines intermediate adjacent normal operation steps of the program. In response to the decoding of a first instruction, step *n* of the program being a variable function key instruction, those variable function keys designated by the programmer are actuated and associated indicators are activated indicating the active status of the variable function keys. This completes step *n* of the program. During the next step, $n+1$, the subsequent program instruction under the control of the hereinabove described instruction counter and syllable counter, the next instruction which would correspond to a keyboard instruction is withdrawn from main memory, decoded and approriate signals are generated to halt the program and to indicate the occurrence of a keyboard operation. In response to the selection of one of the actuated variable function keys (VFK's), a coded signal is generated indicative of the key actuated by the operator. This signal is decoded and if it is one of the program designated keys the verification thereof is true and it proceeds in a normal fashion as hereinafter decribed. If the verification of the VFK is false, i.e., it is not one of those which has been indicated by the program to be a valid key, the apparatus would go into an error routine and appropriately signal the operator that an error had occured.

In the instance where a proper variable function key (VFK) has been selected by the operator, the verifying circuit, after determining the validity of the selected key, would terminate the keyboard instruction and deactivate any active program select keys and their associated indicators. Thereafter the address of the subroutines selected by the operation of the program key by the operator is computed and the subroutine designated by this address is withdrawn from the appropriate subroutine table. The subroutine instruction read from the subroutine table is coupled to the input of the instruction decoder which generates appropriate signals for instructing and controlling the processor to execute the subroutine instruction. After execution of the selected subroutine the processor generates an appropriate signal for advancing the syllable counter. In the manner hereinabove described this initiates the next program step extraction operation and the program then continues to the next normal serial step of the program.

TRAINING OF MACHINE OPERATORS

The variable function key operation as hereinabove described may be advantageously employed in the training of machine operators. In accordance with this feature of applicants' invention, a particular program may be written to train operators wherein the combined variable function keys 15, associated indicator lamps 17, and operator instruction prompter sheet 21 are employed to lead an operator through the various operations of a machine in accordance with the steps of a particular program.

In accordance with one aspect of the use of applicants' variable function keys as a training aid, various training instructions may be written into the subroutine tables 55'. When it is desirable to instruct the operator, an appropriate variable function key instruction is written into the program. The desired training instruction may be stored in a subroutine table with the indicator lamps 17 and prompter strip 21 used to guide the operator in responding to an instruction by indicating the proper VFK to be operated. This may result in the printing out of the training instructions covering the next steps of the program. Alternatively, the indicator lights 17 associated with the variable function keys 15 may be lighted with the entries on sheet 21 prepared to guide the operator through the training exercise.

In this last mentioned mode of operation, the subroutine table would contain a "no operation" program instruction which when decoded causes the processor to generate an end of step signal. In response to this machine halt instruction, the operator may proceed in accordance with the training instructions on the operator's training prompter sheet 21 to enter the appropriate data for example from the alphanumeric keyboard. In this manner the operator may be taken step by step through a program and given training on the machine. Thus, by employing the indicator lamps, variable function keys and operator's instruction strip in combination, it is possible to train the operator in the operation of the machine without the necessity of having an instructor. Either of these self-training operating modes enables an operator to become familiar with the machine during self-training exercise in accordance with the steps designated by a training program.

While in the foregoing there is disclosed a particular embodiment of applicant's variable function key apparatus in a serial program step accounting type electronic data processing apparatus, it is to be understood that the principles of applicants' invention may be applied in conjunction with other types of apparatus. The structure and operation of the various electronic and logic circuits incorporated in applicant's disclosure may be of any type well known in the art for performing the various logical functions set forth. In light of applicants' disclosure it will be apparent to those skilled in the art that many variations, changes, substitutions and other departures from the disclosed illustrative embodiments may be made without departing from the scope of the applicants' invention which is described with particularity in the appended claims.

What is claimed is:

1. A serial program step electronic accounting apparatus comprising memory means for storing program instructions and object data, input means including a keyboard for entering program instructions and object data into said apparatus, control means for controlling the withdrawal of program instructions from said memory, processor means including a logical arithmetic unit for processing object data in accordance with program instructions, decoder means for generating control signals for controlling said processor in response to program instructions withdrawn by said control means, a plurality of variable function key means responsive to a predetermined group of variable function program instructions for controlling the insertion and execution of one of a plurality of program designatable subroutines intermediate adjacent program steps, and a plurality of program instruction responsive indicator means for signaling the active status of ones of said variable function key means.

2. The accounting apparatus defined in claim 1 additionally including table storage means operatively coupled to said decoder means for storing programmable subroutine instructions, and table addressing means responsive to the operation of one of said variable function key means indicated to be in the active status for computing the address of a selected subroutine in said table storage means.

3. In serial program step electronic data processing apparatus including a keyboard for entering program instructions and information data, a memory for storing program instructions and information data, an arithmetic unit for manipulating data in accordance with program instructions and means for generating an output, the improvement comprising a plurality of variable function keys for selectively controlling branching from a program step to one of a plurality of programmable subroutines intermediate adjacent ones of the serial steps of the program, a plurality of indicator means individually associated with said variable function keys for signaling the active status of ones of said keys, and logical control means responsive to predetermined ones of said program instructions for activating said indicator means and associated variable function keys, said predetermined ones of said program instructions corresponding to respective ones of a group of variable function key instructions.

4. The improvement defined in claim 3 additionally including subroutine memory table means for storing at least one group of programmable variable function key subroutine instructions, one of which is to be executed in response to the operation of one of the variable function keys designated to be in the active status, and subroutine memory addressing means responsive to programmable instructions for locating and reading one of said variable function key subroutine instructions in response to the operation of one of said variable function keys indicated to be in the active status.

5. The improvement defined in claim 3 wherein the logical control means includes driver means for actuating at least one of said indicator means in response to the occurrence of a variable function key program instruction, and register means for logically enabling at least one of said varible function keys in response to the occurrence of a variable function key program instruction.

6. The improvement defined in claim 5 wherein the number of indicator means and variable function keys simultaneously actuatable by said driver means and by said register means comprises any integral number up to the maximum number of indicator means and variable function keys of said apparatus and additionally including means responsive to the operation of one of said variable function keys for returning said data processing apparatus to the next step of its serial program after completion of a selected subroutine.

7. The improvement defined in claim 4 wherein said subroutine memory addressing means comprises program instruction settable register means for storing an address indicating constant, said constant being associated with the memory location at which one of said subroutines to be accessed is stored in said memory table means.

8. The improvement defined in claim 7 wherein said subroutine memory addressing means additionally includes circuit means responsive to the operation of a variable function key for generating a signal indicative of the particular key operated, and means responsive to said register means and to said circuit means for accessing and interrogating a particular subroutine within said subroutine memory table means.

9. The improvement defined in claim 3 additionally including operator prompter means for indicating in conjunction with said indicator means which subroutines are alternatively obtainable at a junction of the program.

10. The improvement defined in claim 9 wherein said prompter means includes a support means for positioning an operator instruction strip proximate said indicator means.

11. The improvement defined in claim 10 wherein said support means includes means for positioning said operator instruction strip proximate said indicator means in a removable manner.

References Cited

UNITED STATES PATENTS

| | | | |
|---|---|---|---|
| 3,187,321 | 6/1965 | Kameny | 340—345 |
| 3,341,819 | 9/1967 | Emerson | 340—172.5 |
| 3,355,714 | 11/1967 | Culler | 340—172.5 |

RAULFE B. ZACHE, Primary Examiner